(12) United States Patent
Buckley et al.

(10) Patent No.: US 6,446,871 B1
(45) Date of Patent: Sep. 10, 2002

(54) METHOD AND APPARATUS FOR STORING REFERENCE CODES IN A WRITING INSTRUMENT AND FOR RETRIEVING INFORMATION IDENTIFED BY THE REFERENCE CODES

(75) Inventors: John E. Buckley, Cumbeland, RI (US); Thomas H. Peterson, Plainville, MA (US); Paul E. Linderson, Warwick, RI (US); Frank Mercurio, Wallingford, CT (US); Robert O. Southworth, Pawtucket, RI (US)

(73) Assignee: A.T. Cross Company, Lincoln, RI (US)

( * ) Notice: Subject to any disclaimer, the term of this patent is extended or adjusted under 35 U.S.C. 154(b) by 0 days.

(21) Appl. No.: 09/335,119

(22) Filed: Jun. 17, 1999

Related U.S. Application Data

(63) Continuation-in-part of application No. 08/994,684, filed on Dec. 19, 1997, now Pat. No. 5,955,719.
(60) Provisional application No. 60/089,891, filed on Jun. 19, 1998.

(51) Int. Cl.[7] .................................................. G06K 7/10
(52) U.S. Cl. ............................ 235/472.03; 235/472.01; 235/462.45
(58) Field of Search ........................ 235/472.02, 472.03, 235/472.01, 462.49, 462.43, 462.46

(56) References Cited

U.S. PATENT DOCUMENTS

| | | | | |
|---|---|---|---|---|
| 3,892,974 A | * | 7/1975 | Ellefson et al. | 250/568 |
| 3,911,270 A | * | 10/1975 | Taub | 250/227 |
| 4,423,319 A | | 12/1983 | Jacobsen | 295/472 |
| 4,800,257 A | * | 1/1989 | Johner | 235/472 |
| 5,640,193 A | | 6/1997 | Wellner | 348/7 |
| 5,955,719 A | * | 9/1999 | Southworth et al. | 235/454 |
| 6,119,944 A | * | 9/2000 | Mulla et al. | 235/472.03 |

FOREIGN PATENT DOCUMENTS

| | | |
|---|---|---|
| EP | 0 351 063 | 1/1990 |
| GB | 2 306 669 | 5/1997 |
| WO | WO 98/03923 | 1/1998 |
| WO | WO 98/40823 | 9/1998 |

* cited by examiner

Primary Examiner—Karl D. Frech
(74) Attorney, Agent, or Firm—Mintz, Levin, Cohn, Ferris, Glovsky and Popeo, P.C.

(57) ABSTRACT

An interactive data transfer system and method is provided. In embodiments of the invention, the data transfer system includes a computing device, and a data well for interfacing with an elongate instrument, the elongate instrument having a data transfer end with a data transfer tip. The data well has a housing with an opening for receiving the data transfer tip of the elongate instrument. The data well also has a communications port operatively coupled to the computing device to provide data to the computing device, and the data well has a data communication device contained in the housing for interfacing with the data transfer tip when the data transfer end of the elongate instrument is received in the opening The computing device is programmed to receive data from the data well. The received data includes data indicative of at least one address on a global communications network. The computer device is also programmed, upon receipt of the at least one address, to launch an application to retrieve information related to the at least one address from the global communications network and transmit such information to the computing device.

31 Claims, 15 Drawing Sheets

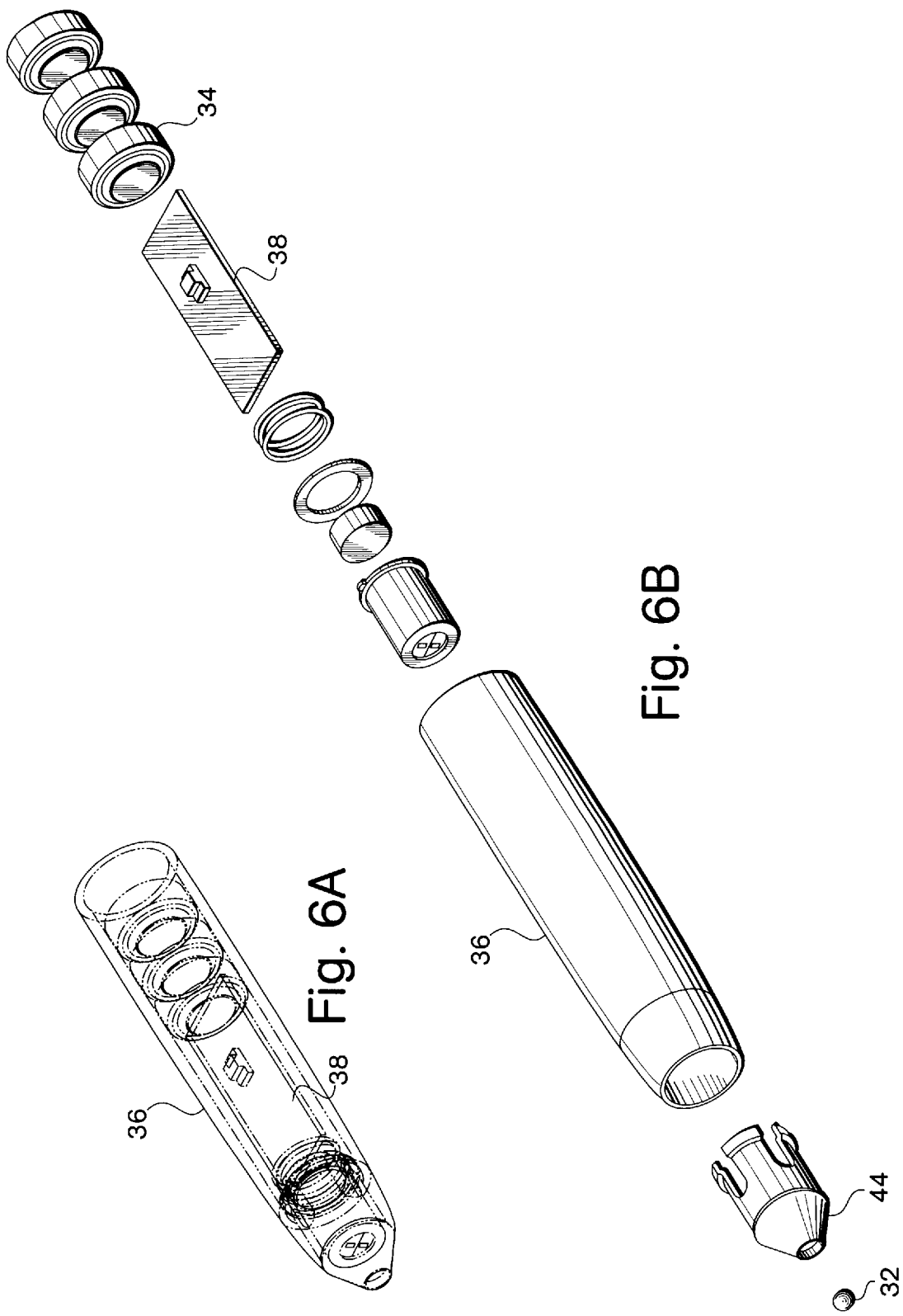

METHOD AND APPARATUS FOR STORING REFERENCE CODES IN A WRITING INSTRUMENT AND FOR RETRIEVING INFORMATION IDENTIFED BY THE REFERENCE CODES

RELATED APPLICATIONS

This application claims priority from Provisional Application Ser. No. 60/089,89 filed Jun. 19, 1998, and is a continuation in part of Ser. No. 08/994,684 filed Dec. 19, 1997, now U.S. Pat. No. 5,955,719, both of which are assigned to the assignee of the present application, the A.T. Cross Company of Lincoln, R.I., and both of which are incorporated herein by reference.

FIELD OF THE INVENTION

The present invention relates generally to a method and apparatus for reading and storing reference codes and subsequently retrieving information identified by the reference codes. More specifically, the present invention relates to a system that uses an instrument having an electronic reading, storage and transmission apparatus incorporated therein to read, store and subsequently transmit reference codes to a computer system. The computer system (which may be connected to a worldwide computer network such as the Internet) retrieves information identified by the reference codes.

BACKGROUND OF THE INVENTION

Readers of newspapers and other periodicals typically encounter articles or advertisements that describe subject matter for which they are interested in obtaining additional information. Articles in typical periodicals are limited in the amount of information they can convey because of space constraints and because of the desire to transfer information in a concise manner to a large number of readers. Many of the readers have only limited interest in the subject matter of a particular article.

While the use of concise articles attracts a large number of readers, those readers who wish to obtain more information on the subject matter of an article are often frustrated by the limited content provided in concise articles. These frustrated readers will often times read several periodicals or utilize online internet news and information services to obtain the information they desire. When using online news and information services, users are typically required to conduct a number of time consuming searches to obtain the information they desire. Thus, a need exists for a simple way of obtaining additional information related to articles of interest.

In addition, in today's every increasing use of catalogues by both consumers at home or at work and by sales personnel working for companies, the user must write down, or otherwise note, the catalog number(s) and often the price(s) for a selected item or items he or she wishes to purchase or order. This is time-consuming and often involves mistakes in recording the appropriate catalog number or in sending the correct catalog number to the company or catalog store. These recording mistakes can lead to a variety of consequences, including non-requested items being sent to the user, incorrect prices, and the need for returns.

Sales personnel, after having visited with customers or clients, must often fill out long order forms related to the products and/or services which have been ordered by customers and must relay such order forms (often by mail or fax) to a home or company office so that the order form may be processed. Information concerning a method of payment may be sent separately. Authorization for shipment related to the method of payment may also cause delays and confusion.

Furthermore, when a securities client, i.e., a consumer or prospective purchaser of bonds, stocks or other securities, wishes to buy or sell such securities, the client customarily contacts his or her broker or trader over the telephone or fax or in some instances over the Internet and types in or writes down the particular stock or other security and the number of shares of such stock or other security. This may lead to mistakes such as the stock symbol being incorrectly transcribed, the number of shares to be bought or sold being incorrectly transcribed, or an intended "buy" order being transcribed as a "sell" order. Thus, a need exists for a simple, less error-prone way to order items from a catalog or to trade securities.

U.S. Pat. No. 5,496,071 to Walsh, incorporated herein by reference, describes a prior art method in which a reference code is inserted in a periodical article to allow the article to be subsequently referenced and/or indexed using the code. However, the disclosure of Walsh does not provide a system that enables a reader of an article containing a reference code to easily obtain additional information concerning the subject matter of the article. Further, the reference codes utilized in the method disclosed by Walsh typically require an electronic device to read the codes. Periodicals are often read on a train, bus or airplane when the reader would not have access to a typical code reader to allow the reader to record and store the reference code for future use.

U.S. Pat. No. 5,640,193 to Wellner, incorporated herein by reference, describes a method by which a user may scan a printed bar code or alphanumeric I.D. code to obtain information about the object with which the bar or I.D. code is associated through transmittal over a communications medium such as the Internet to retrieve the information.

U.S. Pat. No. 5,764,906 to Edelstein, et al., incorporated herein by reference, discloses an electronic resource annotation/denotation, request and delivery system permitting a user to locate design information on a computer network or system such as the Internet without the user having to know, for example, the universal resource locator (URL) of the desired resource.

U.S. Pat. No. 5,804,803 to Cragun, incorporated herein by reference, describes an information retrieval device designed to obtain information which may be related to the object based on data which is encoded on the object.

U.S. Pat. No. 5,812,776 to Gifford, incorporated herein by reference, relates to methods of processing service requests from a user to a server through a network which may be performed without the use of a URL descriptor to identify the information sought.

PCT Published Application WO98/24036, incorporated herein by reference and published Jun. 4, 1998, describes a data retrieval system which incorporates a bar code reader to access information resources which are contained on the Internet.

PCT Published Application WO97/01137, incorporated herein by reference and published Jan. 9, 1997, describes a system and method for utilizing identification codes on objects to access resources over the Internet relating to those objects.

PCT Published Application WO98/03923, incorporated herein by reference and published Jan. 29, 1998, describes a bar code scanner and computer program to obtain information available on the Internet relating to information printed in a newspaper, book, magazine, catalog or other printed material.

PCT Published Application WO98/06055, incorporated herein by reference, also describes a computer coupled with a bar code reader for accessing information on the Internet or an intranet.

SUMMARY OF THE INVENTION

Embodiments of the present invention overcome drawbacks of the above-mentioned publications and provide a method and apparatus for allowing a reader to easily store a reference code associated with a periodical, article, or advertisement using a convenient writing implement. The writing implement includes an electronic data reading, storage and transmission apparatus. Furthermore, embodiments of the present invention facilitate catalog shopping for both customers and sales personnel. Embodiments of the present invention also facilitate trading of securities. Embodiments of the invention produce fewer mistakes than occur in a manual system which requires printing, or otherwise reproducing, numbers or codes.

Previously, and by way of example, a reader of a newspaper or periodical who wanted to record a reference to a particular Internet website, while commuting was required to write down the site's uniform resource locator (URL) on a piece of paper. Later on, the reader would locate the piece of paper, turn on a computer, and type the URL into a web browser.

The systems and methods of the present invention save time by allowing a user to simply scan a code imprinted on an object to perform any of a number of tasks or transactions. The code can correspond to a variety of information such as URL sites. Embodiments of the present invention provide a system in which a detected reference code is transferred automatically to a computer system. The computer system can use an Internet browser to locate Internet sites on the World Wide Web that contain information related to the article, advertisement, catalog item or security associated with the detected reference code.

One embodiment of the invention includes a writing implement. The writing implement includes a writing end and, at the end opposite to the writing end, a data transfer end. The data transfer end reads reference codes associated with coded objects. The data transfer end is then placed into a data well. The data well communicates with a computer or other electronic device via a cable. Alternatively, the data well can communicate with a computer via wireless communication technology. In still another embodiment, the writing implement can communicate directly with a computer using wireless communication technology. The wireless communication technology can include an infra-red or a radio-frequency link. Once the writing implement transmits signals representing the scanned code to a computer, the computer launches an application to bring the computer user to the Internet site or other location which was referenced by the scanned code. Alternatively, when a user logs on to her computer and connects to the Internet, one embodiment of a system according to the invention presents a link or links associated with the scanned code or codes. The links can be presented in association with the user's favorite portal.

Thus, a user can retrieve information relating to newspapers or other periodicals, a customer can order an item from a catalog, and a client can trade stocks or other securities. All of these actions can be performed expeditiously with relatively few mistakes. The present invention facilitates a user's ability to retrieve information on the Internet or other broad-based computer communication network using an altered version of a commonly-carried writing instrument.

BRIEF DESCRIPTION OF THE DRAWINGS

For a better understanding of the present invention, reference is made to the drawings which are incorporated herein by reference and in which:

FIGS. 6(A) and 6(B) are a perspective view and a perspective exploded view, respectively, of one embodiment of the electronic pen of FIG. 2;

DETAILED DESCRIPTION

In embodiments of the present invention, a bar code is placed in proximity to, e.g., at the beginning, middle or end of, an article or advertisement in a periodical. While the term "periodical" is used in this specification, it should be understood that the term is meant to encompass all other forms of printed matter, such as newspapers, magazines, books, cookbooks, labels on articles, etc.

A reader interested in obtaining additional information concerning the subject matter of the article or advertisement utilizes a code reader contained in an instrument such as a pen to read and store a unique code identifying the article. Subsequently, the reader installs the pen in a data well that is designed to receive the unique code from the pen and transmit the code to a computer system.

Alternatively, the pen can communicate directly with the computer. In other words, no physical connection, e.g., no data well, is used. Instead wireless communication technology, such as an infra-red link or other electromagnetic link, is used to allow the pen to communicate directly with a computer.

One embodiment of a computer system according to the invention can also transmit codes or other information through the data well to the pen, or directly from the computer to the pen, for later use by the user. The computer system can contain a database of codes and World Wide Web Internet addresses corresponding to the codes. The computer system then may access Internet sites corresponding to the addresses associated with the particular code to provide the user with further information related to the subject matter of the article or advertisement. Alternatively, the computer system may have no such database of codes but may rather possess the ability to communicate with a site outside the computer system, which site may contain the database for associating codes to Internet addresses.

Figure 1:
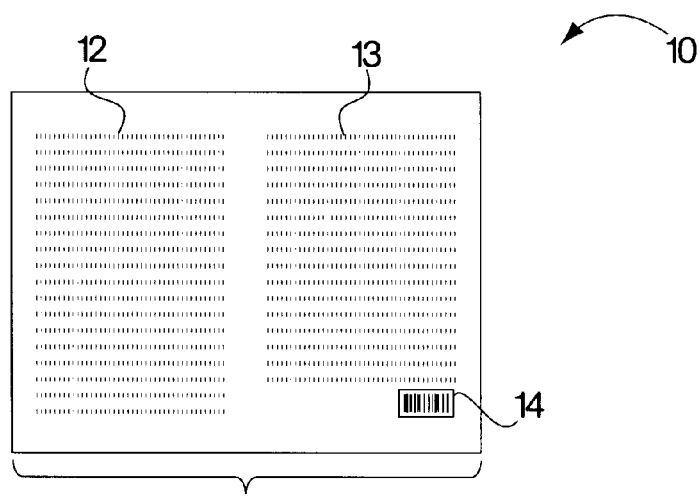
FIG. 1 shows a periodical article having a bar code contained therein.

Embodiments of the present invention will now be described further with reference to FIGS. 1–8. FIG. 1 shows a periodical article 10 having a first column of text 12 and a second column of text 13. The periodical 10 also includes a bar code 14 located at the bottom of the second column. As discussed above, the bar code may contain a unique identifying code to identify the article. The bar code may be implemented using one of a number of known bar codes formats or may be a unique code designed specifically for use with embodiments of the invention. Further, the bar code may be located at locations other than at the bottom of the article, such as the top of the article or in a margin adjacent the article. In addition, the bar code may be included adjacent a title of the article in an index or table of contents in the periodical. Although the term bar code is used in describing embodiments of the invention, such embodiments are not limited for use with bar codes, but rather may be used with any machine-readable code (such as an alphanumeric code) which is scannable or readable by the implements, e.g., pens, of the present invention.

While in FIG. 1 the reference symbol 10 refers to a periodical containing a bar code 14 located at the bottom of the second column, it may be seen that the article 10 may rather be an order form such as the type found in a home catalog, currently a very popular method for shopping. Thus, columns 12 and 13 can constitute photographs and other descriptions of articles, each of which may be prefaced or followed by an appropriate bar code 14.

Figure 2A:
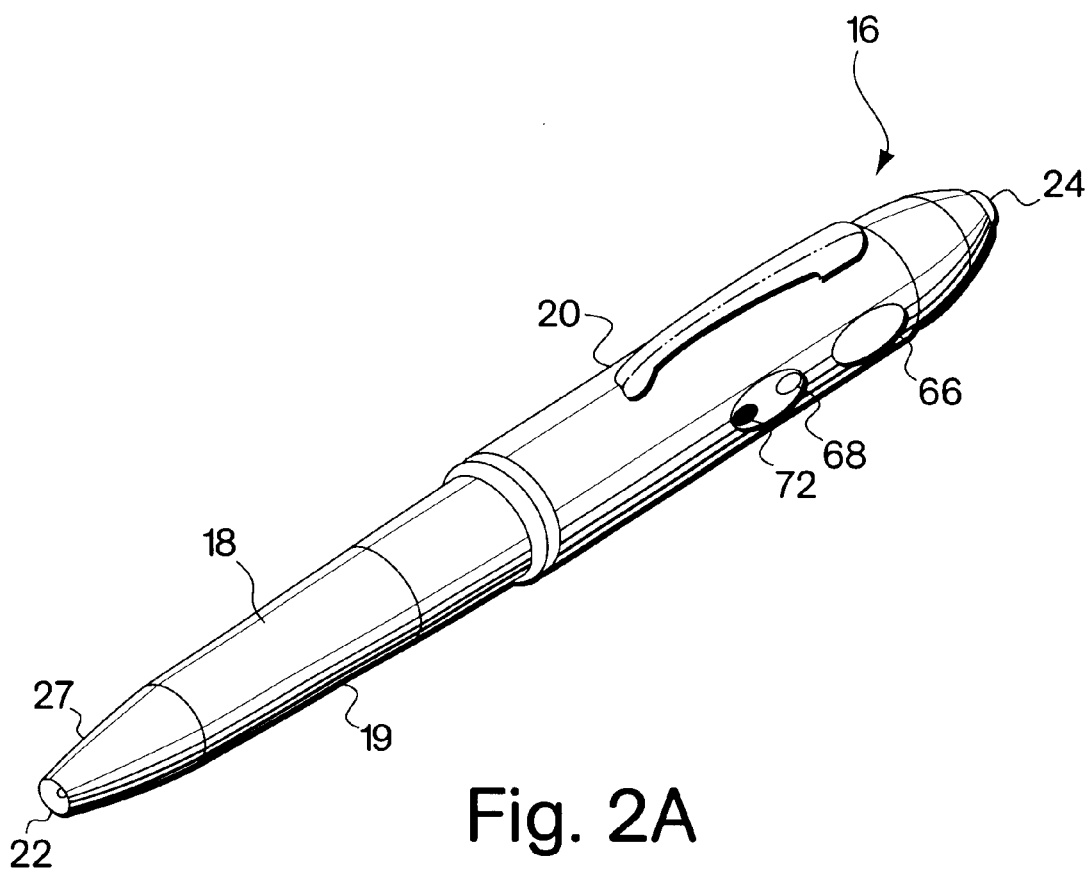
FIGS. 2(A)–2(E) show an electronic pen used in one embodiment of the present invention for reading the bar code of FIG. 1.
Figure 2B:
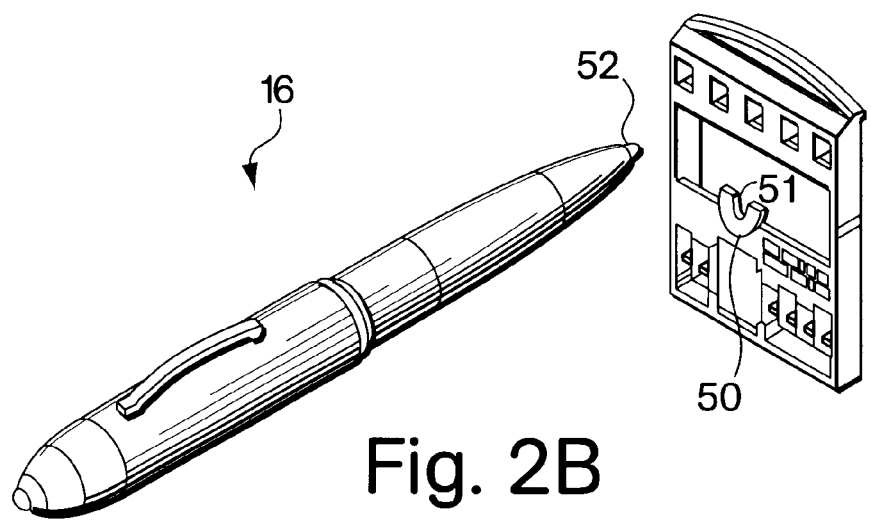
Figure 2E:
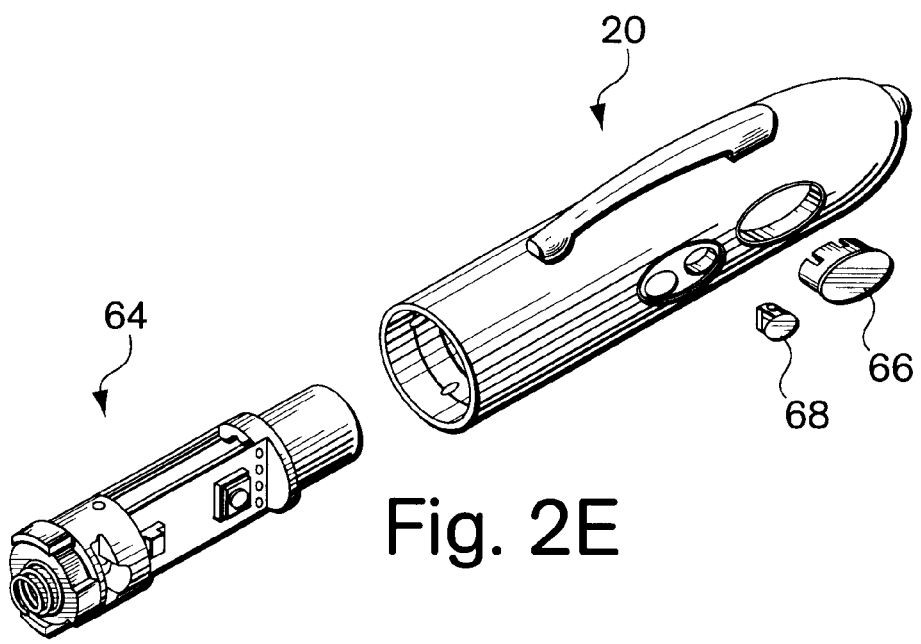
Figure 2C:
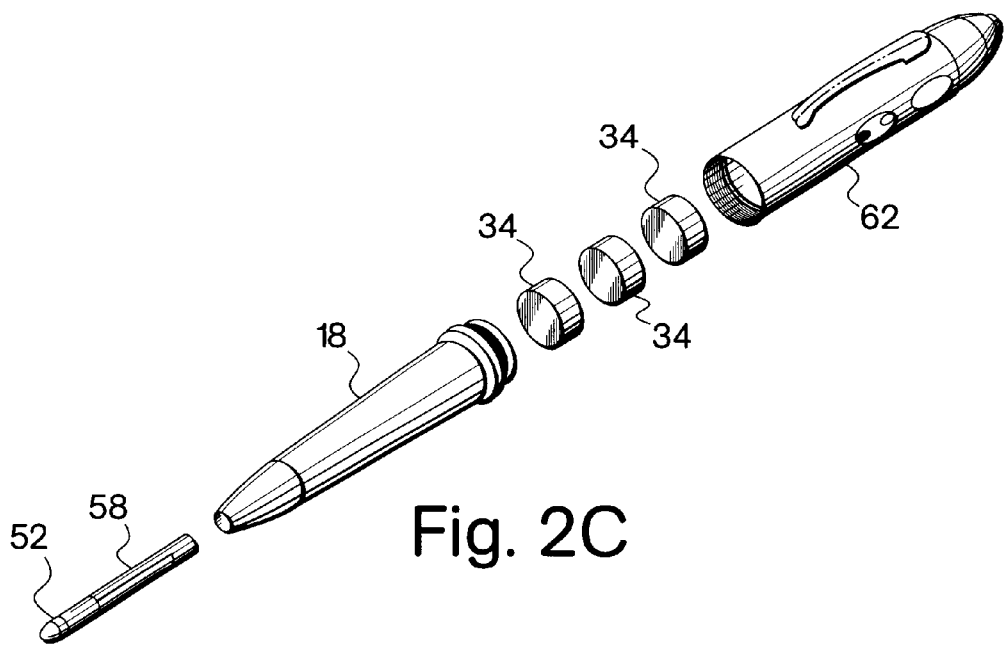
Figure 2D:
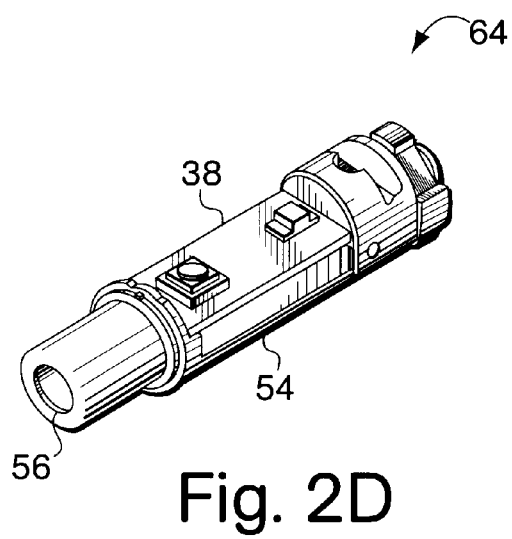

One embodiment of the present invention, as illustrated in FIG. 2A, includes an electronic pen 16 with a writing segment 18 and a data transfer segment 20. A consumer can order a selected item that has an associated code using the data transfer end 20 of the writing implement 16 by performing the following steps. A consumer scans the code 14 and inserts the data transfer end 20 of the writing implement 16 into the data well 26 shown in FIGS. 3(A) and 3(D). Upon insertion of the data transfer end 20 of the writing implement 16 signals representing the scanned code are transferred to the computer 28 through cable 30.

Alternatively, the data reader 16 can communicate directly with a personal computer using wireless communication technology, e.g., a radio-frequency (RF) link, an infrared link, or other electromagnetic link, as described further below. In other words, circuits in the data reader both read the code associated with an article and communicate with a personal computer or other electronic device.

Upon transferring signals representing the scanned code to the computer 28, an application on the computer 28 contacts a company's site on a wide-area network, e.g., on the Internet, corresponding to the scanned code. Furthermore, the scanned code can include instructions to order a particular item or items from the company.

In addition to use by consumers for catalog shopping, the present invention may be used by travelling sales personnel. Travelling sales personnel can order any one of a number of items from their own catalog or order book by scanning a barcode 14 associated with a selected item and transferring signals representing the scanned barcode to the computer 28.

Upon receipt of the transferred signals, an application on the computer 28 sends an order to the home office via a wide-area network such as the Internet.

In addition to the above applications, a user or stock broker may secure the purchase or sale of stocks or other securities over, for example, the Internet, by performing the following actions. The user scans a code which corresponds to a particular stock or other security. The user also scans a code for a buy, sell or other type of trade. In addition, the user scans another code for the number of shares of such security to be traded. Obviously, a single bar code may be implemented to perform all three categories of information desired.

FIGS. 2(A)–2(E) show one embodiment of an electronic pen 16 used to read and store the bar code 14. As noted above, the electronic pen 16 is comprised of two segments, a writing segment 18 and a data transfer segment 20. The electronic pen also includes a power source such as batteries 34.

The writing segment contains a conventional pen having a writing tip 22 from which ink is dispensed. The writing segment 18 includes a refill cartridge 58 that has an extraction groove 52 in selected proximity to the distal or writing end of the refill cartridge. A user can insert the refill cartridge 58 into an extraction tool 50 so that the extraction groove 52 on the refill cartridge 58 mates with the slot 51 of the extraction tool 50. The user can then pull on the pen away from the extraction tool 50 in the direction of the longitudinal axis of the implement 16 to remove the refill cartridge 58. Subsequently, a user can simply insert a replacement refill cartridge. As can be seen in FIG. 2(A), the writing segment 18 includes a barrel 19 and a rotating end segment 27. Rotation of the end segment 27 relative to the barrel causes an internal mechanism (not shown) to extend and retract writing tip 22.

The data transfer segment 20 includes a scan tip 24 that is moved across the bar code 14 to read the code. The scan tip 24 can include a polycarbonate window and a sapphire ball. The sapphire ball is preferably transparent. The data transfer segment also includes a data transfer assembly 64. The data transfer assembly includes an analog printed circuit board (PCB) assembly 38 and a digital PCB assembly. The data transfer assembly further includes a sensor 2 and/or transmitter 56 for detecting a code 14 associated with an article 10 and transmitting a signal representing a code to an information interface.

The data transfer segment further includes a button 66, an LED 68, and a speaker 72. The button 66 allows a user to activate the scanning and transmitting function of the transfer segment. The LED 68 and speaker 72 provide the user with audio and visual signals regarding the success of particular scanning or transmitting actions. One version of the electronic pen 16 is disclosed in copending application Ser. No. 08/994,684, filed Dec. 19, 1997, entitled "Data/Penwell" assigned to the same assignee as the present invention, the disclosure of which is incorporated herein by reference.

Figure 3A:
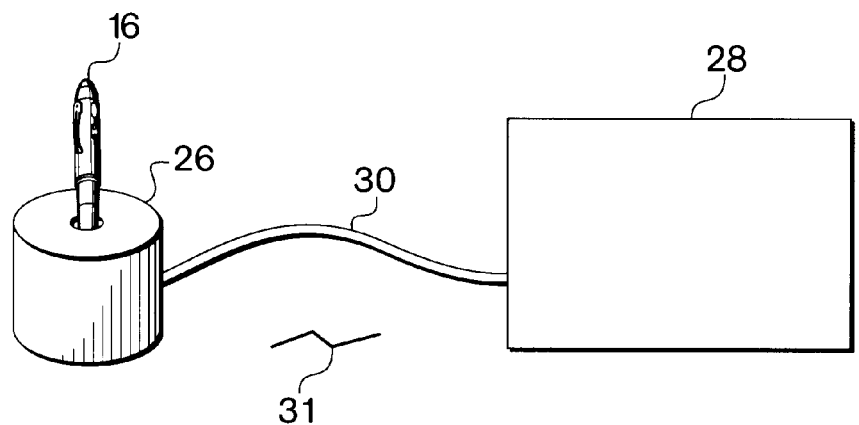
FIGS. 3(A)–3(E) show an interaction of the electronic pen of FIG. 2 with a pen well coupled to a computer system in accordance with one embodiment of the present invention.

FIG. 3(A) shows one embodiment according to the invention in which the electronic pen 16 is disposed in a data well 26 that is coupled to a computer 28 through a serial cable 30. FIGS. 3(B)–3(E) are a series of views illustrating the electronic pen 16 being inserted into a data well 26. After one or more codes have been stored in the electronic pen, the electronic pen is placed in the data well 26. The pen transfers the codes to the data well by well-known methods. The data well 26 in turn transfers signals representing the scanned codes through the serial cable to the computer.

Figure 3B:
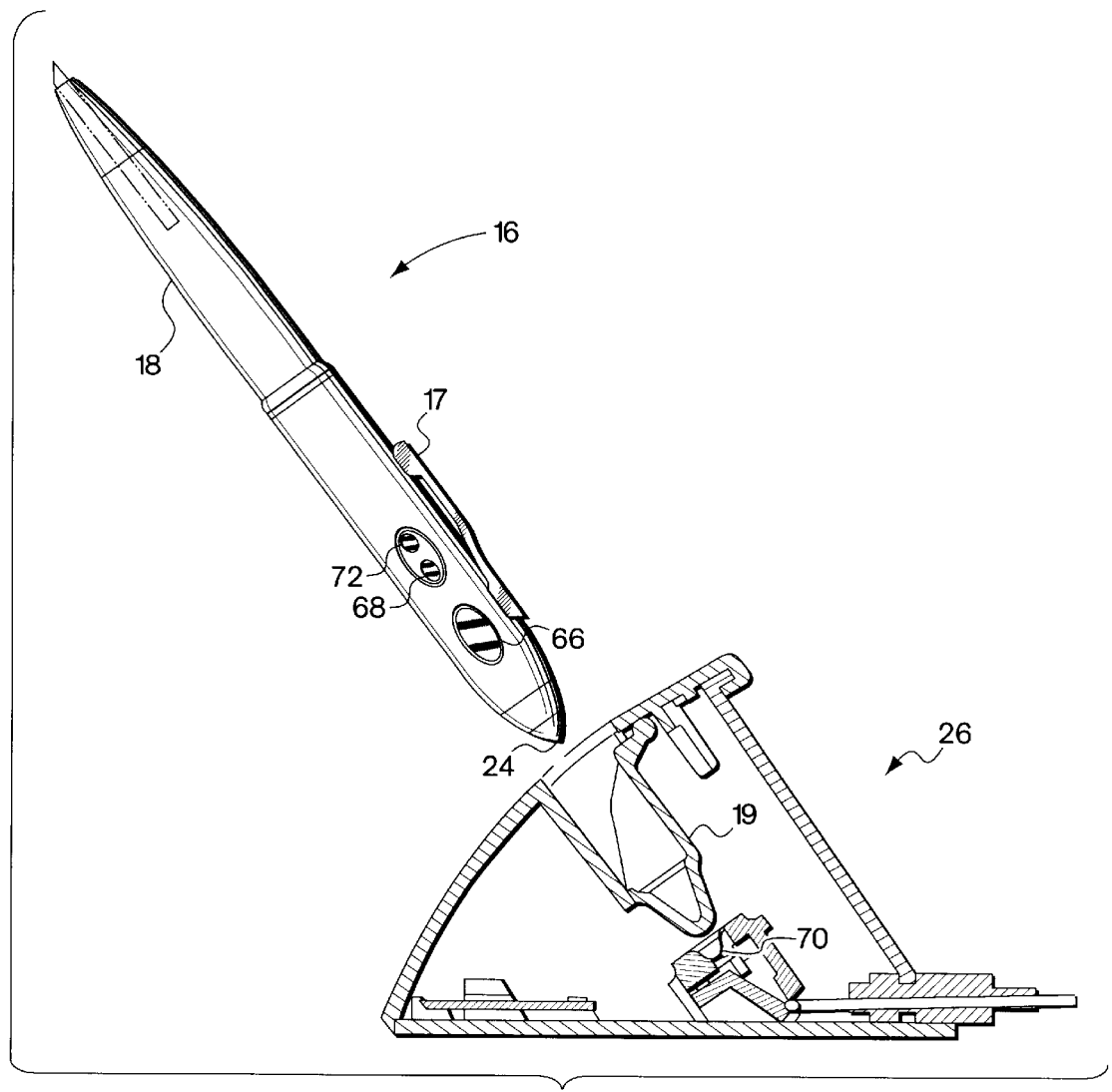
Figure 3C:
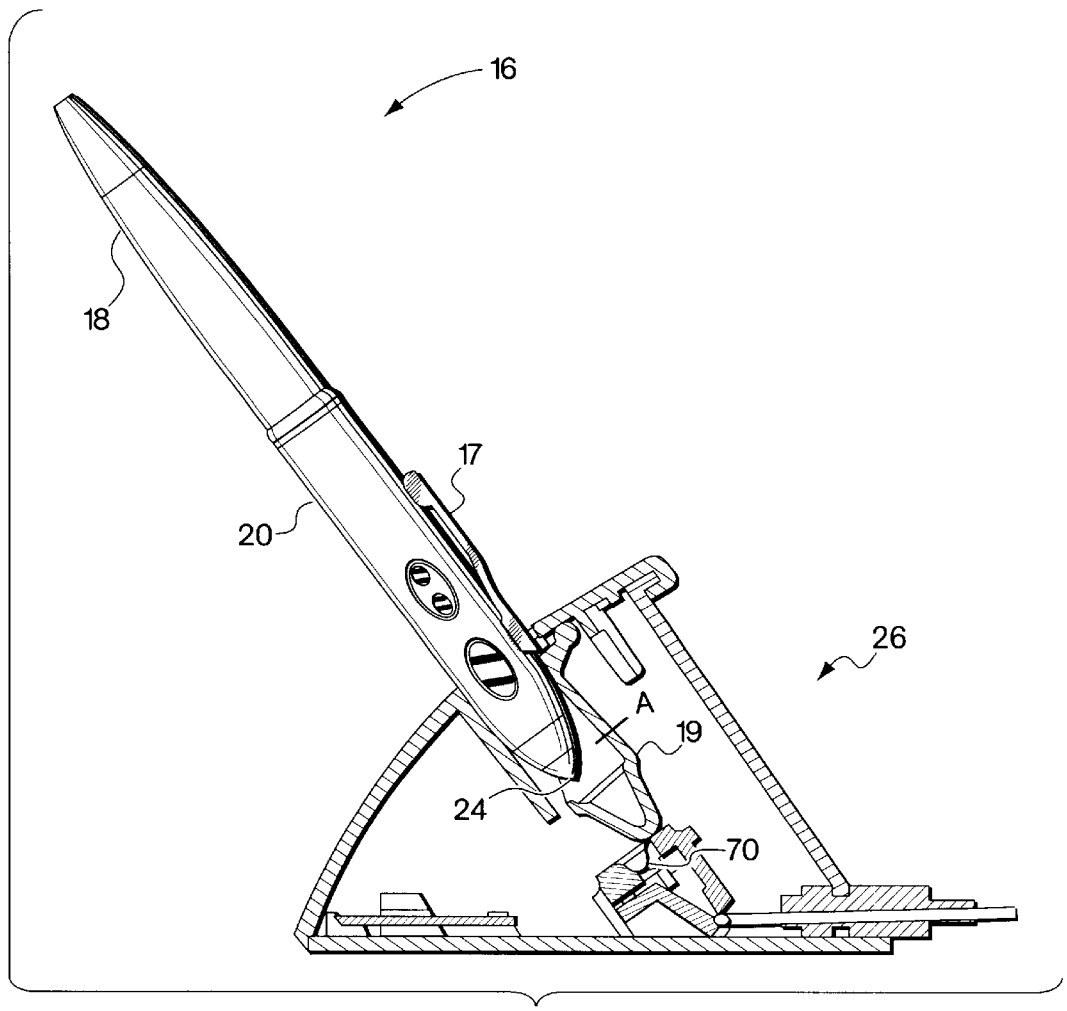
Figure 3D:
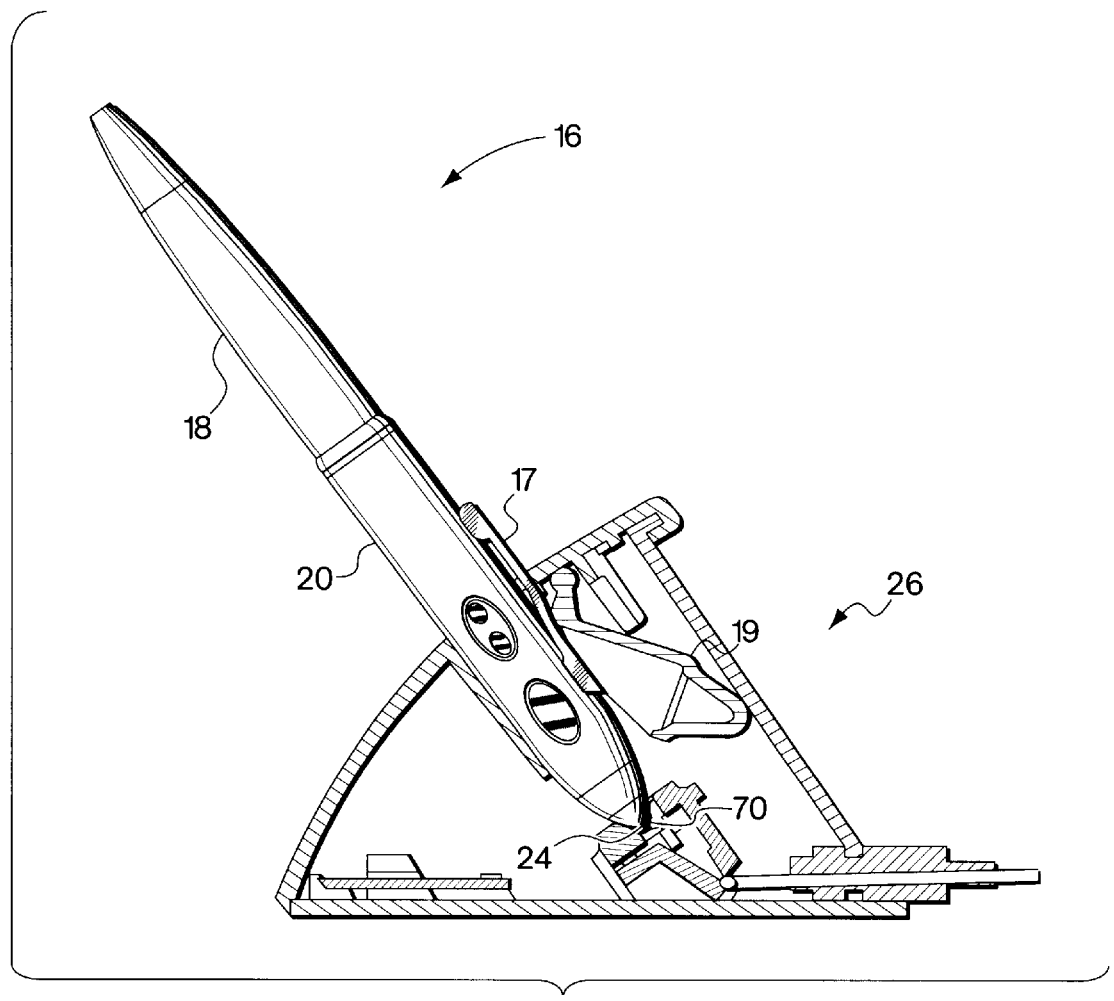
Figure 3E:
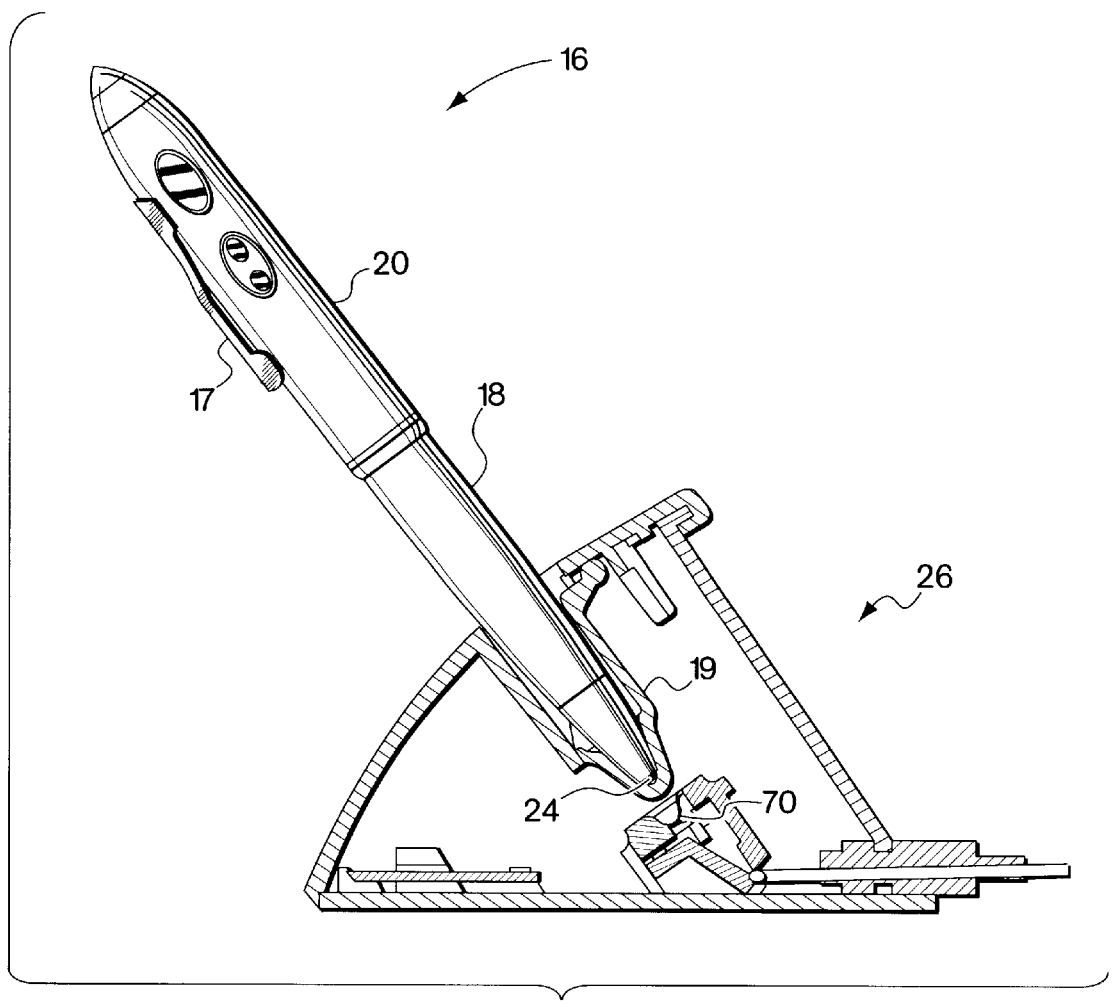

In one embodiment of the invention, either end of the pen 16 can be inserted into the data well 26. If the writing segment 16 is inserted into the well 26, the writing segment 16 is held in shutter 19, as shown in FIG. 3(E). However, if the data transfer segment 20 is inserted into the well 26, the clip 17 of the pen 16 engages the shutter 19 and causes the shutter 19 to rotate in the direction of arrow A in FIG. 3(C). Once the data transfer segment 20 is completely inserted in the data well 26 the shutter 19 is rotated out of the pen's way and the data transfer tip comes in operable proximity to the data reader 70, as shown in FIG. 3(D). The data well 26 can then download information stored in the pen 16.

The data well may be implemented utilizing a product manufactured by the A.T. Cross Company of Lincoln, R.I., described in the co-pending patent application entitled "Data/Pen Well", Ser. No. 08/994,684, filed Dec. 19, 1997, referred to previously. In some embodiments of the present invention, the data well may contain a battery charger to charge one or more batteries located in the electronic pen.

In FIG. 3(A), the data well 26 is shown coupled to the computer 28 through a serial cable 30. As understood by those skilled in the art, the data well could alternatively be coupled to the computer using other known techniques such as a wireless link (e.g., a radio frequency (RF) link or an infrared link) shown as reference number 31 in FIG. 3. In another embodiment, the data well could be fully integrated with a personal computer, i.e., the personal computer could have a built in data well for receiving a data reader 16.

In yet another embodiment, the data reader 16 can communicate directly with a personal computer using wireless communications, e.g., a radio-frequency (RF) link, an infrared link, or other electromagnetic link, as noted above. In other words, circuits in the data reader both read the code associated with an article and communicate with a personal computer or other electronic device.

To facilitate such wireless communication, the data transfer tip 24 of the data reader, e.g., electronic pen 16, can include a sapphire ball 32, as shown in FIGS. 6(A)–6(D). The sapphire ball 32 allows at least certain frequencies of electromagnetic radiation, e.g., visible light, to pass through the data transfer tip 24. The sapphire ball 32 can act as a roller ball similar to a roller ball in a ball point pen.

Furthermore, the data reader can include a pressure sensitive switch assembly 38, 40, 42, 44 which activates the scanning assembly in the data reader when pressure is placed on the data transfer tip. The pressure switch assembly includes rolling ball/optical assembly 44 for operating the data transfer tip switch scanning functionality. The pressure switch assembly further includes an analog printed circuit board (PCB) assembly 38, and a switch contact 42 in proximity to a contact spring 40. The contact spring 40 is compressed when pressure is applied on ball 32. When the contact spring 40 is compressed past a certain point the pressure switch is activated.

Thus, in operation, a user would run the sapphire ball 32 of the data transfer tip 24 across the code 14 associated with an article 10 as if writing a line through the code in order to scan the code into the data reader. Alternatively, the electronic pen can include a proximity sensor for sending a signal to the processing circuit 60 of FIG. 7 when the ball 32 is located in proximity to code 14.

Figure 7:
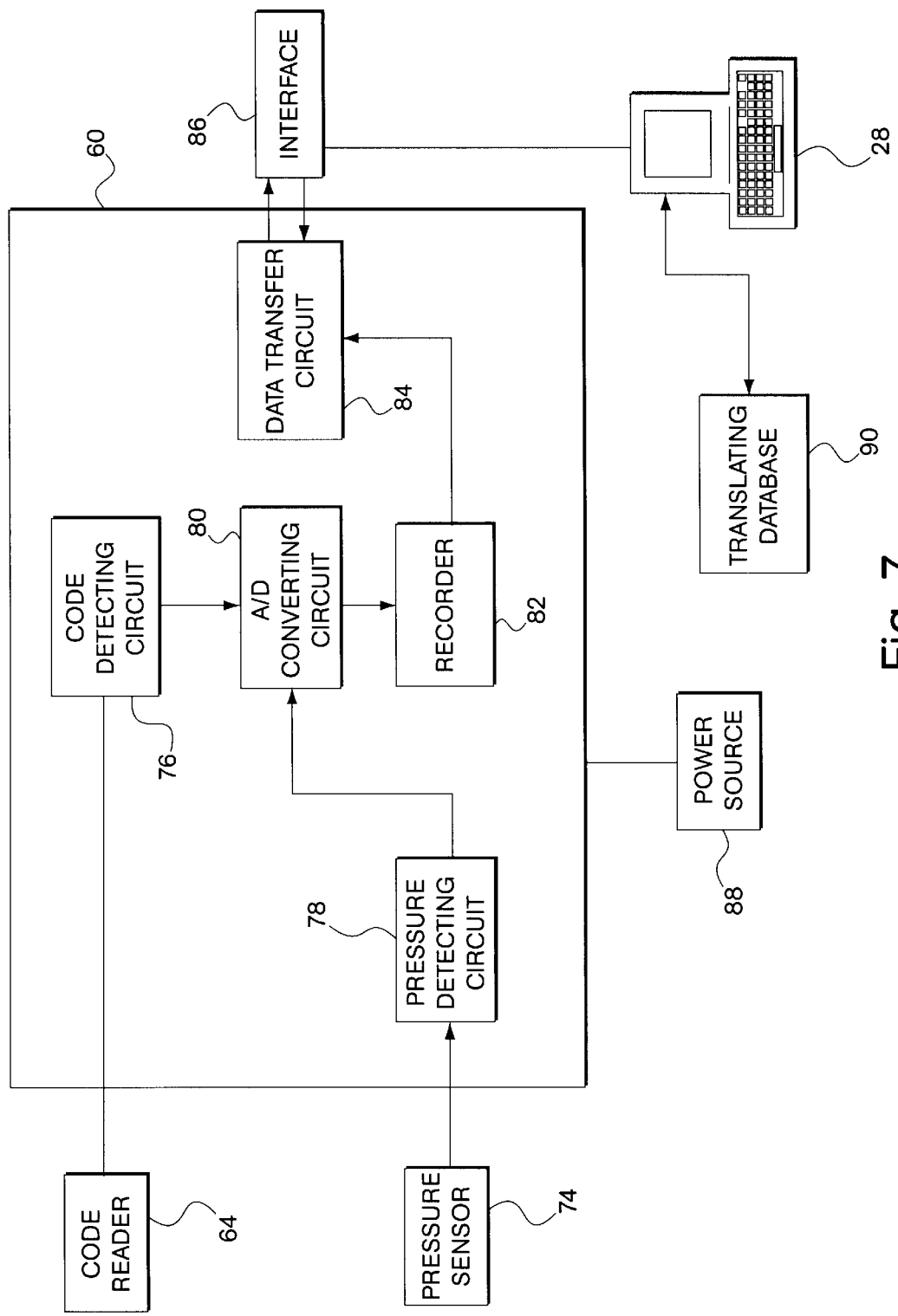
FIG. 7 is a schematic block diagram of one embodiment for signal processing for components of the electronic pen of FIG. 2.

As illustrated in FIG. 7, the data reader, e.g., pen, can include signal processing circuitry 60. According to this embodiment, the code reader 64 sends signals to a code detecting circuit 76 which in turn sends detected signals to an analog digital converter 80. Similarly, the pressure sensor 74, including the sapphire ball 32, rolling ball/optical assembly 44, contact spring 40, and switch contact 42, sends signals to the pressure detecting circuit 78 which in turn sends pressure detection signals to the analog digital converter 80.

Under appropriate conditions, i.e., when signals are received from both the code detecting circuit 76 and the pressure detecting circuit 78, the converter 80 sends code detected signals to the recorder 82. Under appropriate conditions, e.g., when the pen 16 is inserted into a data well, the recorder 82 sends recorded signals to the data transfer circuit 84. The data transfer circuit 84 transfers recorded signals to the interface 86 and receives input signals from the interface 86. The interface 86 interfaces with a computer 28 which has access to a translating database 90 for translating recorded code signals into another form of information, e.g., a uniform resource locator address.

In one embodiment, the data reader 16 includes a bar code reader of a type which is available from Symbol Technologies, Inc. of Holtsville, N.Y. However, in alternative embodiments, other types of scanners, e.g., laser-based scanners, can be contained in the data transfer portion of the electronic pen 16. Such alternative scanners can be capable of reading alphanumeric symbols or other indicia in addition to, or in lieu of, bar code symbols.

Figure 8:
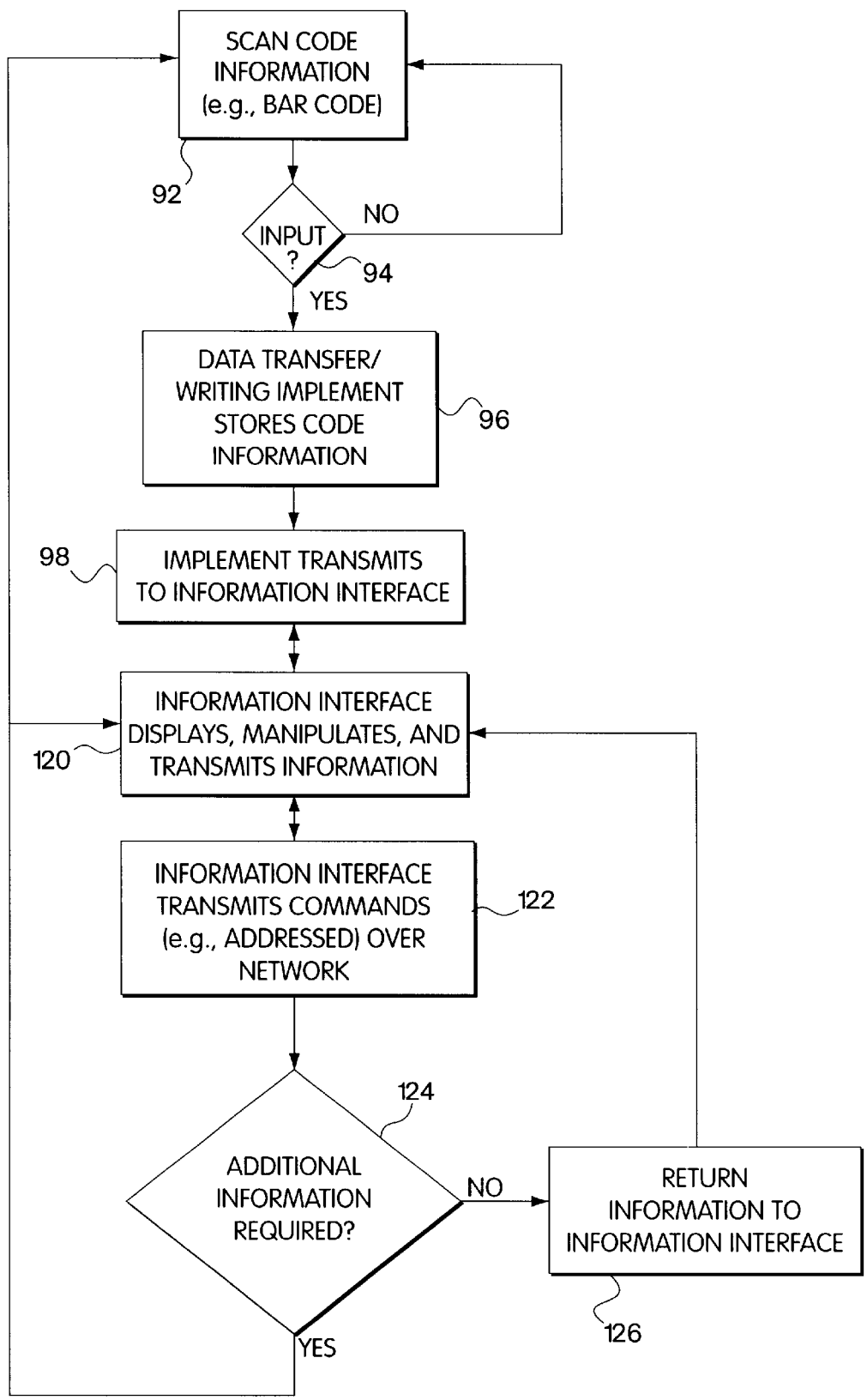
FIG. 8 is a flow chart illustrating the operation of the apparatus of FIG. 5.

One embodiment of a method according to the present invention includes the following steps, as illustrated in FIG. 8. First a user scans 92 coded information located in proximity to an item, e.g., an article. The system determines 94 whether the coded information was detected. If the information was detected, the data reader stores 96 the code information. The data reader then transmits 98 the code information to an information interface. The information interface, which can be a computer or other electronic device, displays and manipulates 120 information, as will be described further below. The information interface also transmits 122 information, e.g., a URL address, over a network. The system then determines if additional information is required 124. If more information is required an appropriate request is displayed at the information interface. Otherwise, the requested information is returned to the information interface.

In one embodiment of the present invention, the bar code is implemented using a bar code having 6 to 12 numeric characters in a size format that is small enough to be unobtrusively placed in a periodical article or advertisement, yet large enough to be clearly read by a data reader, e.g., an electronic pen. For articles or advertisements contained in newspapers, it is desirable to use larger bar codes because of the relatively poor quality of print used in typical newspapers. In one embodiment, the bar code includes a numeric string designated as $X_1 X_2 X_3 X_4 Y_1 Y_2 Y_3 Y_4$, where the X values are used to designate one of 10,000 periodicals, and the Y values are used to designate one of up to 10,000 articles associated with the periodical. Similarly, the X values and Y values may be used to note a particular catalog and items in that catalog or a particular stock and quantities of that particular stock or other instrument.

In embodiments of the present invention, the computer 28 is programmed to receive codes from the data well, and upon receiving a code, to access a database contained either within the computer or at a remote location, e.g., using the Internet. In one embodiment, by way of example, a remote database is accessed by the computer through an Internet server using one of a number of known web browsers. The database provides an Internet home page URL address corresponding to the first four characters of the numeric string, and the computer system connects to the internet site corresponding to the URL address using the web browser. At the Internet site, the last four characters of the numeric string are used to identify the address of a home page corresponding to the particular article or advertisement or product or stock whose bar code was scanned by the reader.

In embodiments of the present invention, the home pages corresponding to articles or advertisements may be maintained by a print publisher such as a newspaper or magazine, while the database of periodicals may be maintained by a service agency to which both readers and publishers could subscribe. In further embodiments of the present invention previously described, a catalog company may maintain a home page to which a catalogue customer may send an order for one or more items within the company's catalogue. Similarly, a salesperson's home office may maintain a home page or other Internet site to which orders may be forwarded for the salesperson's customers. Finally, the stock brokerage or other investment firm may maintain a home page or other Internet site such that its customers or clients may trade stocks and other securities over the Internet by scanning the code corresponding to a particular stock and the number of shares of that particular stock as well as whether it is a buy, sell or other transaction.

The manufacturer or seller of the electronic pen may by itself or with others provide differing types of computer services to users of the electronic pen. In one embodiment, the manufacturer or seller could make available a server which provides organizational and navigation services to users of its electronic pen, whereby gateways to other services, websites and other databases are connected through the manufacturer's or seller's server. Information gathered by such server may be kept by the manufacturer or seller for the purposes of demographic statistics and subsequently sold to others.

In a second embodiment, in contrast to the first embodiment where it acts as a "go-between", the manufacturer or seller could provide its own server with the information represented by the bar code discussed above, and may garner revenue from provision of such information. Additionally, the company may provide the service to users performing searching on other Internet sites or other databases for information requested by a user which is not already provided on its server, and charge fees for such access and service. Obviously, the provision of such services in the above embodiment may be provided by entities other than the manufacturer or seller of the electronic pen, such as a service bureau or a publisher, like a newspaper.

Figure 4:
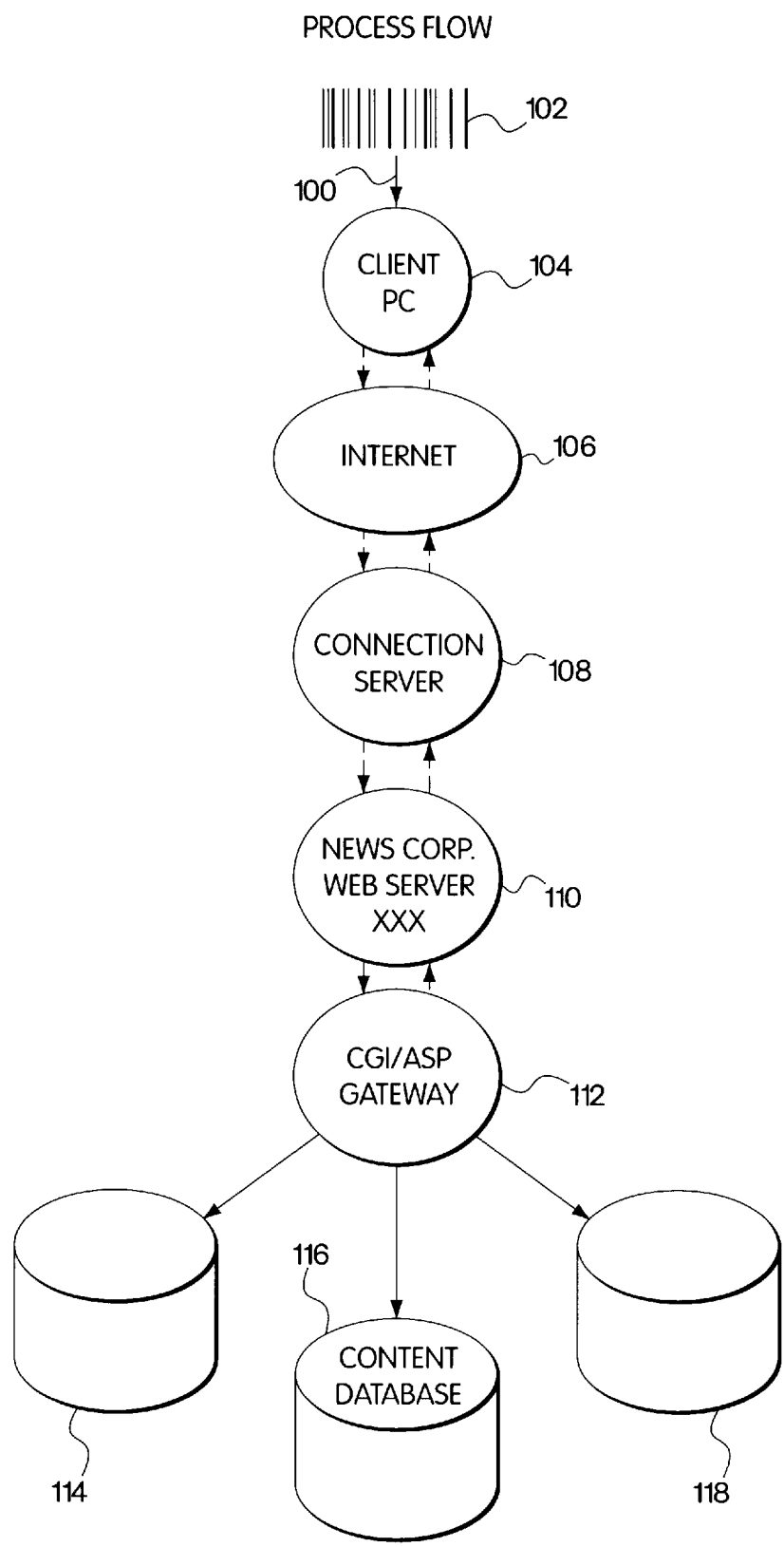
FIG. 4 shows a schematic diagram illustrating one embodiment of a system for storing and retrieving information according to the present invention.

FIG. 4 illustrates yet another embodiment of the present invention. FIG. 4 illustrates a method of implementing what is known in the industry as a "hard" portal which is, for the purposes of this application, defined as a server or group of servers that are in continual communication with a client machine regardless of where the customer or user is on the Internet. One example of this is a service provided by America Online, Inc. (AOL). A preferred manner of providing a hard portal service is to install appropriate application software on the clients/customers/user's machine and to allow the application to run behind the browser, according to well-known techniques. In this way, the application stays in contact with the portal server, and the browser can serve up content anywhere on the Internet.

FIG. 4 illustrates in a flow chart format one embodiment of a process according to the present invention by which a user retrieves information starting with the scanning of a bar code or other alphanumeric symbol. In the first step 100, the user scans a bar code 102 using the implement of the present invention. The scanning implement converts the scanned bar code 102 into a signal representing the scanned bar code 102. The system then transmits the signal representing the scanned bar code 102 to the client's personal computer (PC) 104.

Software on the client's PC receives the signal representing the scanned bar code and runs a browser installed on the client PC 104. The software uses the browser and the signal representing the scanned bar code to connect over the Internet 106 to a connection server 108.

In one embodiment the bar code uses code 128. Furthermore, the bar code can support a sufficient number of characters to encode the application type (interactive print, catalog shopping, securities transaction, etc.), the associated corporation or company or other entity, and the address of the associated article.

The bar code may be divided into two fields: a static field and a dynamic field. The static field may identify the application type (e.g., interactive print) and the corporation or other entity (i.e., *The Washington Post*). The dynamic field may be used to specify a particular article in a content database. The connection server 108 acts as a proxy for the client's PC in that it associates a static field within the bar code with a content provider, e.g., Newsweek or the Washington Post, a catalog company, or a particular stock broker. In other words, the connection server 108 filters out the static information and directs requests to the particular news agency server 110 based on information in the static field The news agency server 110 implements a common gateway interface (CGI) process to dynamically map between a filtered bar code and a corresponding Uniform Resource Locator (URL). The URL refers to specific articles in content databases 114, 116 and 118. Multiple URLs can be associated with a single bar code. The connection server 108 then relays these URLs from the News Corp Web server 110, through the Internet 106, to the client PC 104.

One method of providing a bar code to Internet connection is the indirect method disclosed in published PCT application assigned to Solar Communications of Naperville, Ill., WO97/01137, the text of which is incorporated herein by reference. This PCT application concerns, among other things, a database that relates existing uniform product code (UPC) numbers found on products like soup or soda to Internet URLs. However, Solar Communications' application teaches an input device, i.e., UPC bar code reader, that is attached to a computer. Solar Communications' application does not teach a free and independent data reader that can be used in a variety of environments, e.g., on a train or on an airplane, and subsequently interfaced with a computer to download information obtained by the data reader.

Figure 5:
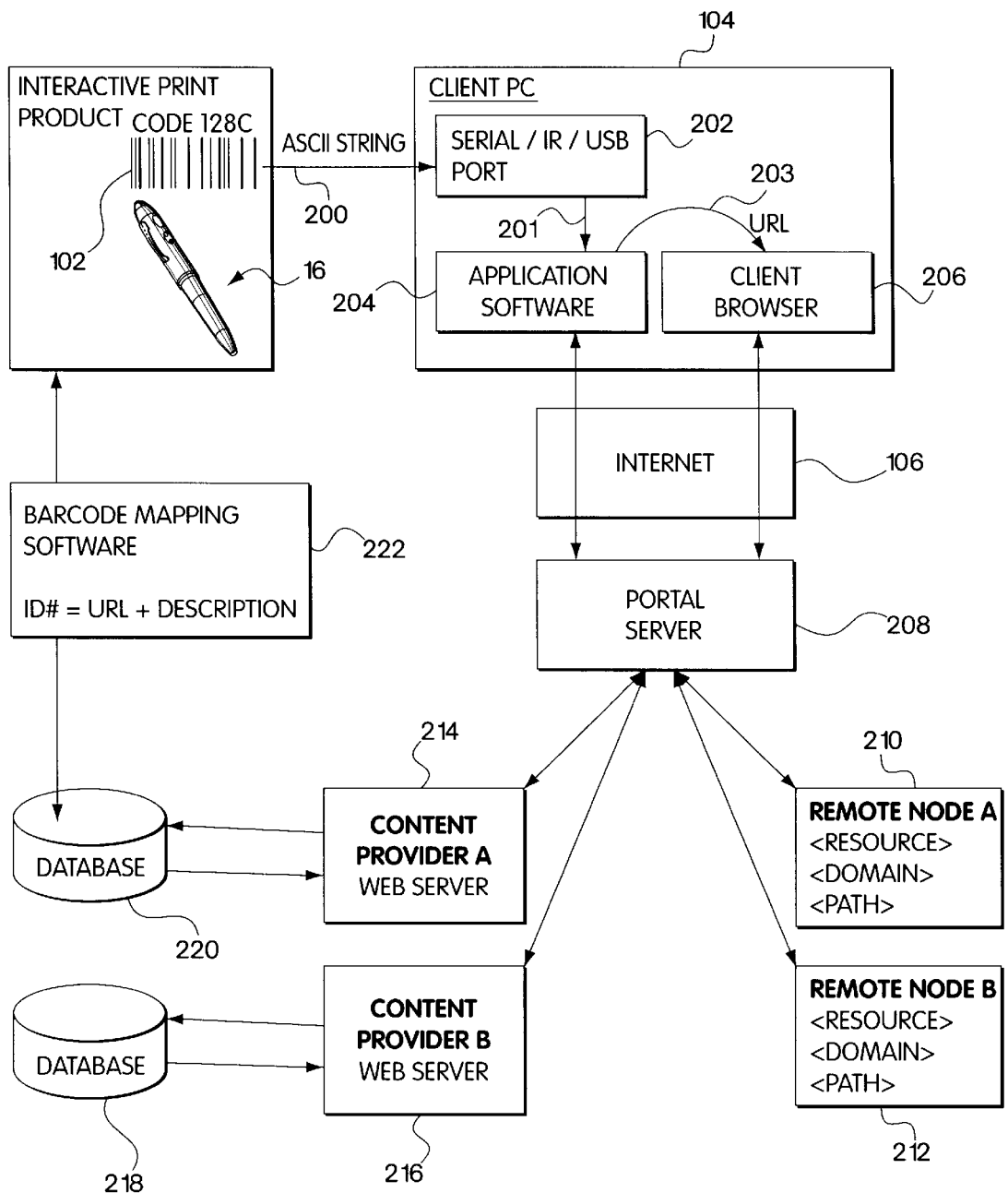
FIG. 5 shows a schematic diagram illustrating an alternative embodiment of a system for storing and retrieving information according to the present invention.
Figure 6C:
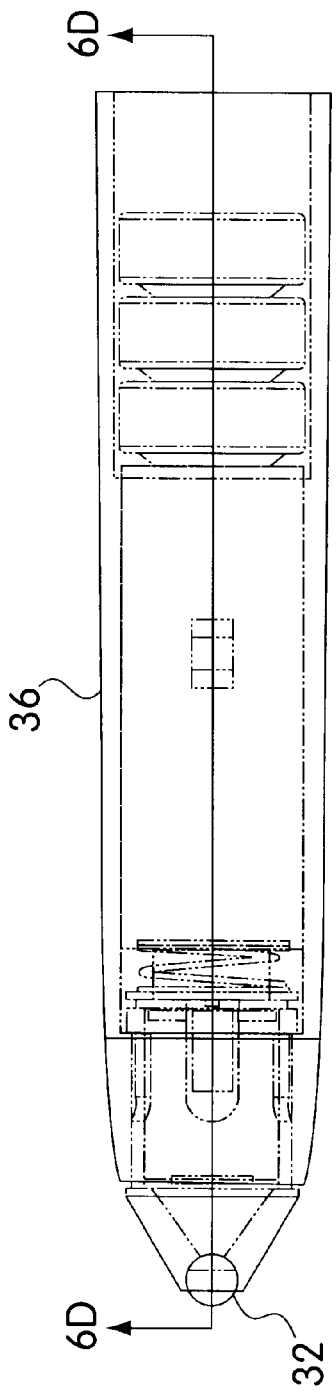
FIGS. 6(C) and 6(D) are a side view and a cross-sectional view, respectively, of the embodiment of the electronic pen of FIGS. 6(A) and 6(B)
Figure 6D:
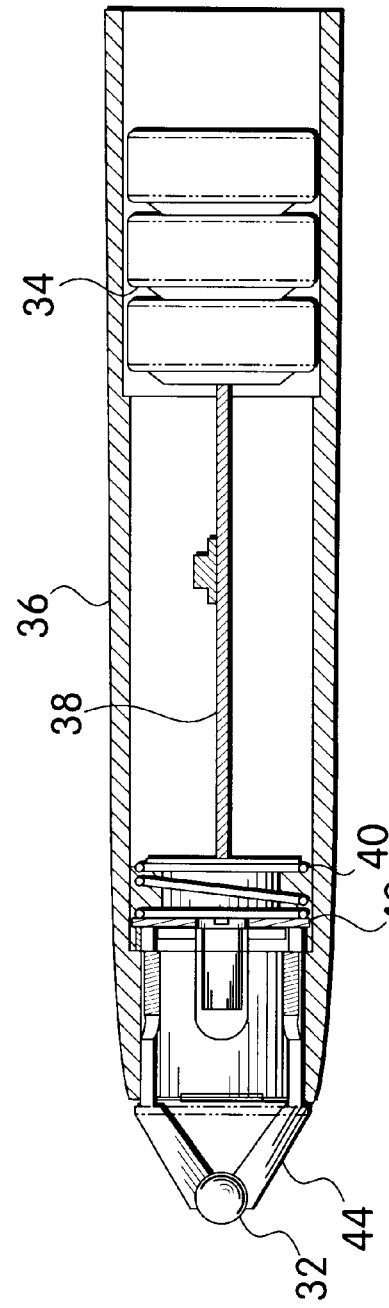

FIG. 5 illustrates in a flow chart format an alternative embodiment of a process according to the present invention. According to this embodiment, a user initiates the retrieval of information related to an article by scanning bar code(s) 102 or other alphanumeric symbol(s) using implement 16. As noted above, the code(s) can include multiple fields. The fields can identify a particular software application, a particular database or content provider, and a particular article within a particular database. The scanning implement 16 converts the scanned code(s) 102 into a signal representing the code(s) 102.

In step 200, the system transmits the signals representing the scanned code(s) to the client's personal computer (PC)

104. In one embodiment, the system can transmit the signals as an ASCII string. Furthermore, the client PC receives the signals through a port 202. The port can be any one of a variety of ports, such as a serial, infrared, or radio-frequency port.

Figure 9:
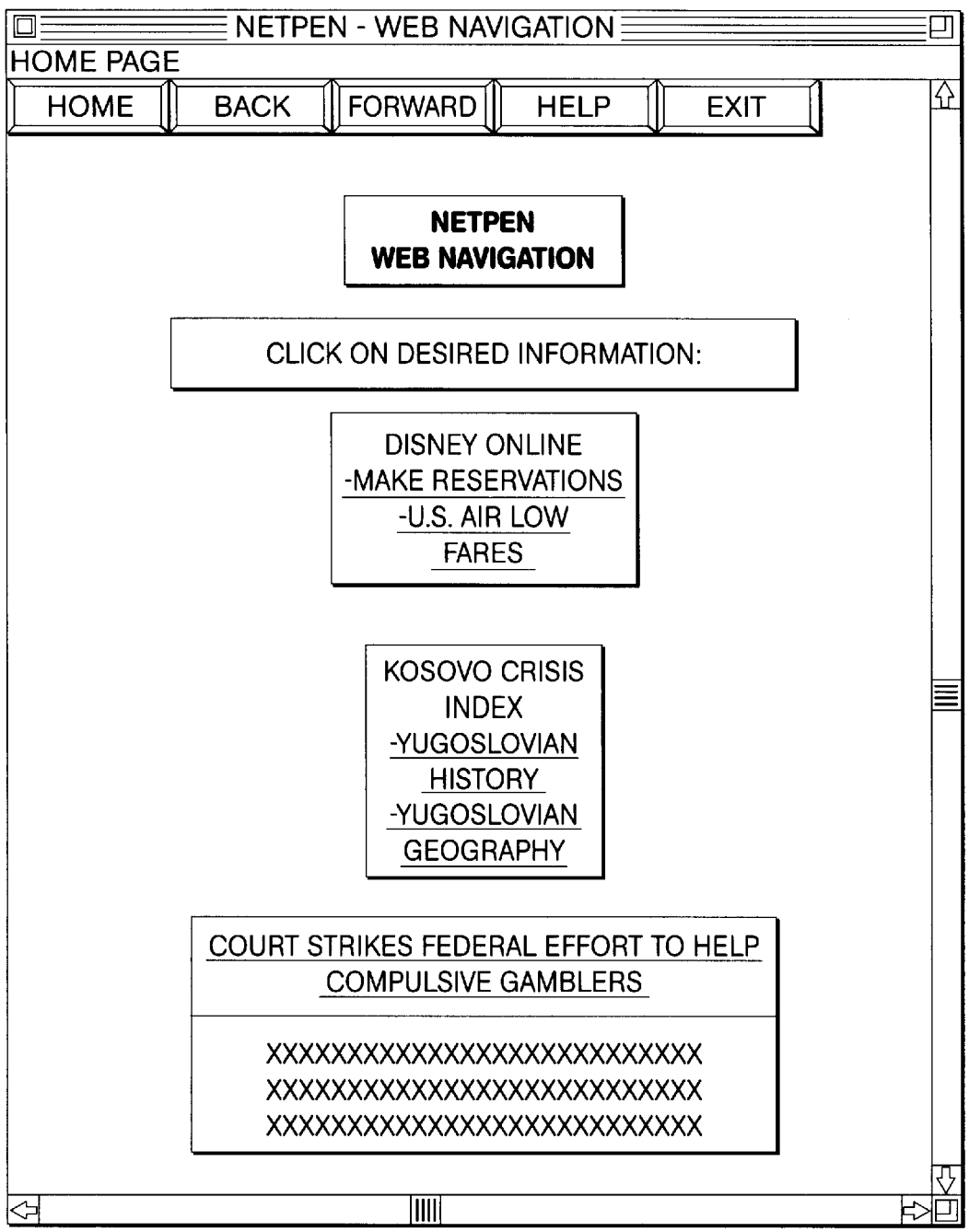
FIG. 9 shows a graphical user interface including links associated with codes such as the code shown in FIG. 1, that a user has scanned using the implement of FIG. 2.

A software application 201 on the client's PC 104 receives the signals representing the scanned code(s) and runs a browser 206. The application 201 filters the signals and/or connects via the Internet 106 and Portal Server 208 to Remote Nodes 210, 212 to determine URLs and other information associated with the scanned bar code(s). In step 203, the application 201 sends the browser 206 the associated URLs and other information. As shown in FIG. 9, the browser then displays the information, e.g., as links. One embodiment of a system according to the invention can integrate links associated with scanned codes into a user's favorite search engine or portal.

A user provided with a variety of links based on previously scanned codes can then select one of the links. The browser 206, activated by the selection of a link, connects via the Internet 106 and the CrossLink Portal Server 208 to a content provider 214 or 216 and to a particular article located in a database 220 or 218 supported by the content provider 214 or 216. In addition, bar code mapping software 222 can map bar codes to articles in a database 220 supported by a content provider 214.

In embodiments of the present invention described above, a code reader is incorporated into a pen. In other embodiments, the code reader may be incorporated in other writing instruments, or may be incorporated in some other, preferably portable, device such as a watch, cellular phone, etc. In still other embodiments, the code reader may be a stand-alone portable device designed to easily fit within a pocket or brief case and may be even incorporated into a laser-pointer-type shaped device which may be attached to a user's keychain.

In another embodiment of the present invention, in place of the bar code, standard characters are used in articles or advertisements as identifying codes, and the electronic pen includes an electronic scanner capable of reading characters. For this embodiment, the computer system includes character recognition software to identify the characters read by the electronic scanner.

While the present invention has been described as being useful in the interactive print, catalog and securities industries, it has utility in a number of other industries and applications. Examples include the following: the utilization of bar or other codes in an encyclopedia to link the user to further information; use of codes in yellow pages or other directories; use of codes for e-commerce banking, wherein a user can scan, for example, an electric utility bill code and pay such bill over the Internet. Other examples include foreign language translation, wherein scanning a code on an object may link the user to a foreign language translation source over the Internet. Yet another example may be interactive shopping wherein the user may scan a number of home products or foodstuffs and order such items by connecting to a supermarket's Internet web site. A further example is the use by poll takers who may scan a particular code which corresponds to the choices of the person or persons being polled.

A still further example is the use of the present invention for standardized test purposes. In this application, a student's or other user's choices are scanned. Once a testing sequence is over, the electronic pen may be utilized to link the answer's to the testing authority's Internet web site, facilitating instant feedback, fewer false hits compared to present pencil-marking techniques due to the accuracy of bar code vending techniques and instant statistical analysis through cumulation of many users' test scanners.

In still another embodiment, the electronic pen has an audio recording module in place of the bar code reader, enabling a user to record an Internet URL address in the recording module. In this embodiment, the pen well includes circuitry to receive the URL address from the electronic pen, either acoustically or electronically, and to transfer the URL address to the computer system. For this embodiment, the computer system contains a voice recognition engine and is programmed to receive the URL address, and upon receipt, to enable a web browser to access the Internet site having the URL address.

In yet another embodiment, the electronic pen has accelerometers capable of detecting and recording in electronic format characters written by the pen. Such an electronic pen is described in U.S. Pat. No. 5,434,371, entitled "Hand-Held Electronic Writing Tool", incorporated herein by reference and assigned to the A.T. Cross Company, of Lincoln, R.I. In this embodiment, a user can trace a URL address in an advertisement or article or write the URL address on paper to record the URL address (or some other code) in the pen. The URL address may then be transferred to the computer in a similar manner to that described above for the other embodiments of the present invention.

In embodiments of the present invention discussed above, a data well is used to transfer stored information from an electronic pen to a computer system. As understood by those skilled in the art, other adapters may be used to transfer information in place of the data well, or alternatively, the electronic pen may be inserted directly into a port in the computer that is designed to receive stored information from the pen. In addition, the pen may communicate with the computer through an infra-red or RF link.

There are several advantages to embodiments of the present invention discussed above. First, service agencies using embodiments of the invention can provide publishers with demographics of readers to assist the publishers in targeting advertisements to particular groups of readers. Second, readers can easily obtain additional information related to the content of articles or advertisements in periodicals. Third, since advertisements containing the bar codes will have the potential of transferring additional information to readers, publishers will be able to derive additional revenues from advertisements. Although it is common for advertisements to contain URL addresses to Internet sites from which readers can obtain additional information, prior to the present invention, readers often lose or forget the URL addresses, before accessing the Internet site.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

What is claimed is:

1. An elongated implement for use in writing and data recordation having first and second end portions, the first end portion being a writing end and having a writing tip at an end ,of the first end portion, the second end portion being a data transfer end and having a scan tip at an end of the second end portion, wherein the writing tip and the scan tip are disposed on diametrically opposite ends of the implement.

2. The implement of claim 1, the writing tip includes a cartridge adapted to supply ink to the writing tip.

3. The implement of claim 2, wherein the writing tip is adapted to be retractable within the first end portion and extensible from the first end portion.

4. The implement of claim 1, wherein the second end portion includes electronic circuitry adapted to record indicia positioned upon a surface.

5. The implement of claim 4, wherein the circuitry adapted to record indicia is bar code reader circuitry.

6. The implement of claim 5, wherein the indicia to be recorded is a bar code.

7. The implement of claim 6, further including a power supply to power the electronic circuitry located in the second end portion.

8. The implement of claim 7, wherein the scan tip includes an optically transparent tip, the optically transparent tip being adapted to permit the recordation of the bar code positioned upon the surface by the electronic circuitry located in the second end portion.

9. The implement of claim 8, wherein the scan tip further includes a proximity means for allowing the scan tip to scan the indicia when the scan tip is proximate the bar code.

10. The implement of claim 9, wherein the optically transparent tip includes a polycarbonate window.

11. The implement of claim 10, wherein the optically transparent tip further includes a sapphire ball.

12. The implement of claim 11, further including a speaker and an optical indicator to indicate to a user the implement commencement and completion of recordation of the bar code.

13. The implement of claim 8, wherein the second end portion further includes electronic circuitry adapted to transfer the recorded bar code through the optically transparent tip to a computing device.

14. The implement of claim 13, wherein the second end portion further includes a communication mechanism for wireless communication with the computing device.

15. The implement of claim 13, wherein the computing device is coupled to a data well that is operative to interface with the implement.

16. The implement of claim 15, wherein the data well includes:
   a housing with an opening dimensioned to receive the data transfer end of the implement;
   a communications port operatively coupled to the computing device to provide data to the computing device;
   a data communication device contained in the housing for interfacing with the scan tip when the data transfer end of the implement is received in the opening, wherein the computing device is programmed to receive data from the data well, the received data including data indicative of at least one address on a global communications network, the computer device also being programmed, upon receipt of the at least one address, to launch an application to retrieve information related to the at least one address from the global communications network and to transmit such information to the computing device.

17. The implement of claim 16, wherein the global communications network includes the Internet.

18. The implement of claim 17, wherein the computing device includes a display device to display information retrieved over the Internet.

19. The implement of claim 16, wherein the data well is contained within the computing device.

20. The implement of claim 16, wherein the computing device includes:
   a communication mechanism for communicating with the elongated implement, the communication mechanism having a receiving assembly for receiving the indicia from the scan tip of the elongated implement; and,
   wherein the computing device is programmed to receive indicia from the communication mechanism, the received indicia including data indicative of at least one address on a global communications network, the computing device also being programmed, upon receipt of the at least one address, to launch an application to retrieve information related to the at least one address from the global communications network and to transmit such information to the computing device.

21. The implement of claim 20, wherein said communication mechanism provides for wireless communication links, including an infra-red link or a radio-frequency link.

22. An elongated implement for use in writing and data recordation having a first end and a second end diametrically opposite the first end, the first end having a writing tip, the it second end including means for scanning and transferring data.

23. The implement of claim 22, wherein the writing tip includes means for supplying ink to the writing tip.

24. The implement of claim 23, wherein the writing tip includes means for retracting the writing tip within the first end and means for extending the writing tip from the first end.

25. The implement of claim 22, wherein the second end includes means for recording indicia positioned upon a surface.

26. The implement of claim 25, wherein the indicia is bar code indicia.

27. The implement of claim 26, further including means for supplying power to the means for recording bar code indicia located in the second end.

28. The implement of claim 27, wherein the means for scanning further includes means for controlling the means for scanning to scan the bar code indicia when the means for scanning is proximate the bar code indicia.

29. The implement of claim 28, further including means for communicating to a user the implement commencement and completion of recordation of the bar code indicia positioned upon the surface.

30. The implement of claim 29, wherein the second end further includes means for transferring the recorded bar code indicia to a means for computing.

31. The implement of claim 30, wherein the means for computing includes means for interfacing with the implement.

* * * * *

UNITED STATES PATENT AND TRADEMARK OFFICE
CERTIFICATE OF CORRECTION

PATENT NO. : 6,446,871 B1
DATED : September 10, 2002
INVENTOR(S) : Buckley et al.

It is certified that error appears in the above-identified patent and that said Letters Patent is hereby corrected as shown below:

Column 12,
Line 63, change ",of" to -- of --.

Column 13,
Line 51, insert a paragraph break after "opening,".

Column 14,
Line 29, delete "it".

Signed and Sealed this

Fourth Day of February, 2003

JAMES E. ROGAN
*Director of the United States Patent and Trademark Office*